United States Patent [19]

Tamura et al.

[11] Patent Number: 5,949,155
[45] Date of Patent: Sep. 7, 1999

[54] NON-CONTACT ELECTRIC POWER TRANSMISSION DEVICE

[75] Inventors: Hideki Tamura; Mikihiro Yamashita; Yoshinori Katsura, all of Shiga, Japan

[73] Assignee: Matsushita Electric Works, Ltd., Osaka, Japan

[21] Appl. No.: 08/882,043

[22] Filed: Jun. 25, 1997

[30] Foreign Application Priority Data

Jun. 25, 1996 [JP] Japan .................................. 8-164956

[51] Int. Cl.⁶ .................................................. H01F 27/28
[52] U.S. Cl. ...................... 307/107; 307/17; 340/310.07; 336/DIG. 2; 439/950
[58] Field of Search ................ 307/104, 17; 340/310.07; 439/950; 336/DIG. 2

[56] References Cited

U.S. PATENT DOCUMENTS

| | | | |
|---|---|---|---|
| 3,743,989 | 7/1973 | Nicolas et al. | 336/DIG. 2 |
| 4,038,625 | 7/1977 | Tompkins et al. | 336/DIG. 2 |
| 4,675,638 | 6/1987 | Szabo | 336/DIG. 2 |
| 5,122,729 | 6/1992 | Itoga et al. | 323/347 |
| 5,229,652 | 7/1993 | Hough | 307/104 |
| 5,267,393 | 12/1993 | Purohit et al. | 336/192 |
| 5,311,028 | 5/1994 | Glavish | 250/492.21 |
| 5,422,519 | 6/1995 | Russell | 307/104 |
| 5,506,560 | 4/1996 | Takeuchi et al. | 336/DIG. 2 |
| 5,536,979 | 7/1996 | McEachern et al. | 307/104 |
| 5,550,452 | 8/1996 | Shirai et al. | 336/DIG. 2 |
| 5,680,028 | 10/1997 | McEachern | 320/2 |
| 5,747,894 | 5/1998 | Hirai et al. | 307/104 |

FOREIGN PATENT DOCUMENTS

| | | | |
|---|---|---|---|
| 370 929 | 5/1983 | Austria | H02P 13/00 |
| 2 029 468 | 12/1971 | Germany | H01R 41/00 |
| 90 12 505 | 8/1991 | Germany | E05B 47/00 |
| 41 00 272 A 1 | 11/1991 | Germany | G05F 1/66 |
| 44 12 957 A 1 | 10/1995 | Germany | H01F 38/14 |
| 195 40 854 A 1 | 5/1997 | Germany | G08C 17/04 |
| 8-512454 | 12/1996 | Japan | H02J 17/00 |
| 1 349 788 | 4/1974 | United Kingdom | H01F 29/10 |

*Primary Examiner*—Albert W. Paladini
*Attorney, Agent, or Firm*—Sughrue, Mion, Zinn Macpeak & Seas, PLLC

[57] ABSTRACT

A non-contact electric power transmission device comprising a feeding member which includes an induction coil to which electric power is applied and the non-contact electric power transmission device further comprising a plurality of fed members which each further comprise an induced coil placed within a magnetic field produced by the induction coil. The fed members differ in the load applied and each of the fed members is independently designed to accommodate its respective load as well as to accommodate a single feeding member. While the respective loads differ, only the design of the respective fed member is modified to accommodate the different load value while no modifications to the single feeding member are made.

14 Claims, 7 Drawing Sheets

FIG. 9
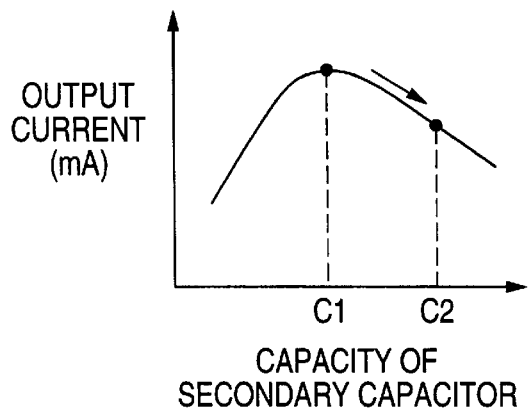
FIG. 10 (a)
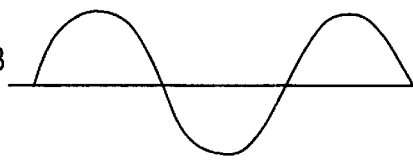
CAPACITY C1
POINT B
FIG. 10 (b)
CAPACITY C2
POINT B
FIG. 10 (c)
CAPACITY C1
POINT C
FIG. 10 (d)
CAPACITY C2
POINT C
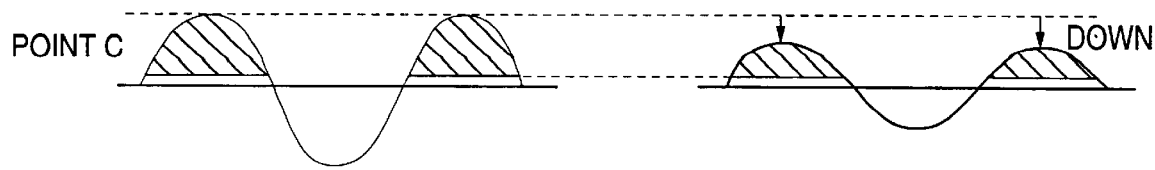
DOWN

5,949,155

NON-CONTACT ELECTRIC POWER TRANSMISSION DEVICE

BACKGROUND OF THE INVENTION

1. Field of the Invention

This invention relates to a non-contact electric power transmission device comprising an induction coil, disposed in a feeding member, to which electric power is applied and an induced coil disposed in a fed member which is further placed within a magnetic field generated by the induction coil of the feeding member.

2. Description of the Related Art

As shown in FIG. 7, in a non-contact electric power transmission device, an induced coil 4 disposed in a fed member 3 comprising a rectification circuit 30 and a load 31 is positioned in a magnetic field generated by an induction coil 2 disposed in a feeding member 1 comprising a rectification smoothing circuit 10 and an oscillation circuit 11, whereby electric power is transmitted to the induced coil 4 by way of electromagnetic induction. Because electric power can be transmitted from the feeding member 1 to the fed member 3 without exposing a charge section to the outside environment, the non-contact electric power transmission device is often used in devices that require a waterproof structure.

Thus, a non-contact electric power transmission device has previously been designed wherein both a circuit portion that contains the induction coil 2 of the feeding member and a second circuit portion that contains the induced coil 4 of the fed member 3 become responsive to the load 31 of the fed member 3.

In this case, if the load 31 varies, both of the aforementioned circuits, that of the feeding member 1 and that of the fed member 3 must be modified in order to accommodate the change in the load. Thus, the design time for an appropriate non-contact electric power transmission device for a given load encompasses the design time needed for both circuits, making the time extend over a long period of time.

SUMMARY OF THE INVENTION

It is therefore an object of the present invention to provide a non-contact electric power transmission device for which the design time required when faced with a varying load is reduced substantially.

According to the first aspect of the invention, there is provided a non-contact electric power transmission device which comprises a feeding member which further comprises an induction coil to which electric power is applied. The non-contact electric power transmission device further comprises a fed member that further includes an induced coil and a load, the induced coil being placed within a magnetic field which is produced by the induction coil. Each fed member is independently designed to be compatible with any single feeding member and each independently designed fed member contains its own unique load. Further, within each fed member accommodations are provided which are described hereafter for adjusting the electric power that is supplied by the feeding member to further accommodate the power requirements of the load while avoiding the need to modify the design of the feeding member.

According to a second aspect of the invention, there is provided a plurality of non-contact electric-power storing apparatuses to which constant electric power is supplied. Each electric-power storing apparatus comprises an induced coil for receiving the constant electric power, an independent load, and accommodations for adjusting the constant electric power supplied thus further accommodating the power requirements of its respective independent load.

BRIEF DESCRIPTION OF THE DRAWINGS

In the accompanying drawings:

FIG. 9 is a graphical representation of the results of the fourth embodiment;

FIG. 10 (a) to 10 (d) are illustrations of the energy waveforms at points B and C in FIG. 8;

DETAILED DESCRIPTION OF THE PREFERRED EMBODIMENTS

Figure 7A:
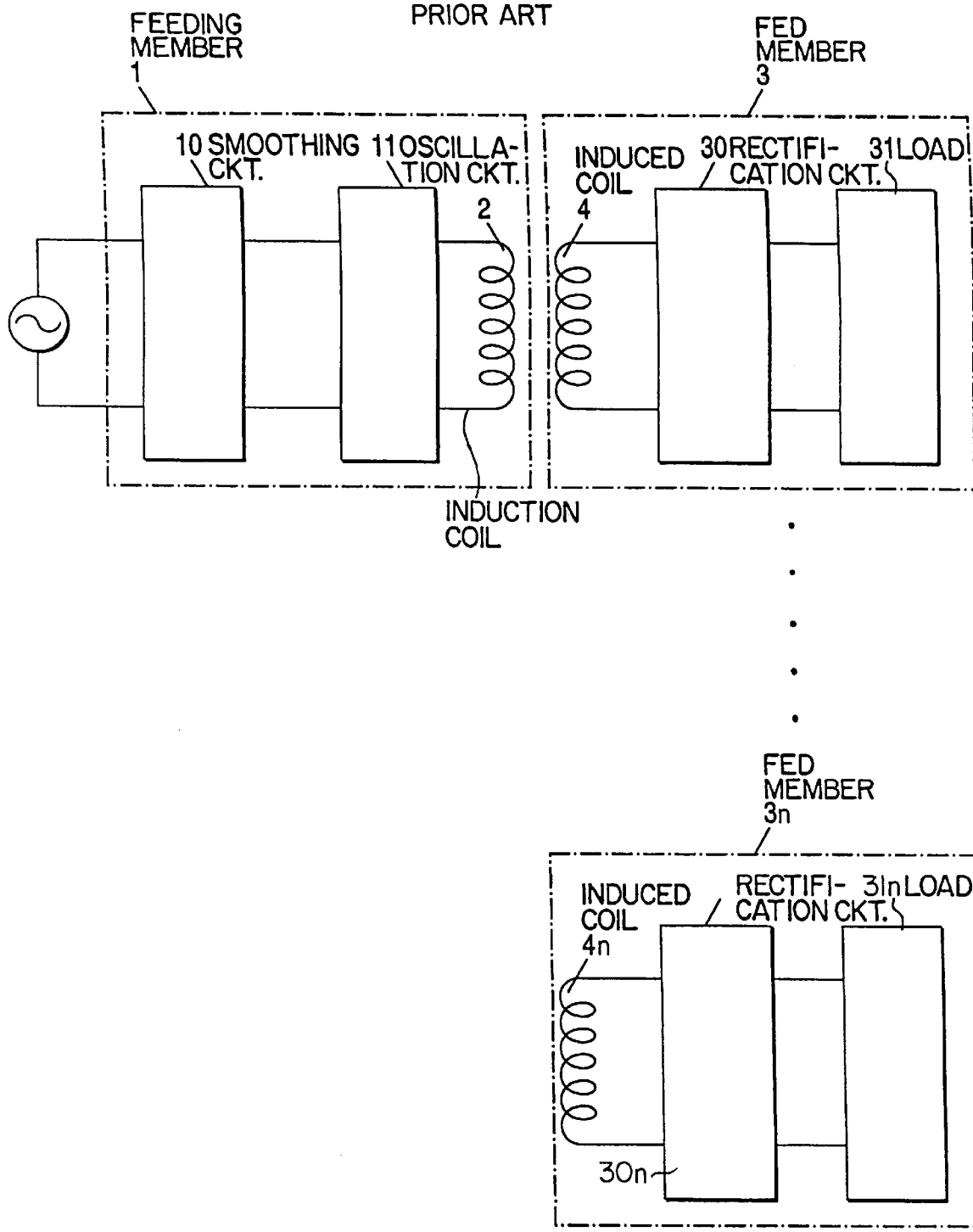
FIG. 7a is a block diagram/schematic drawing illustrating the basic configuration of the invention.
Figure 11:
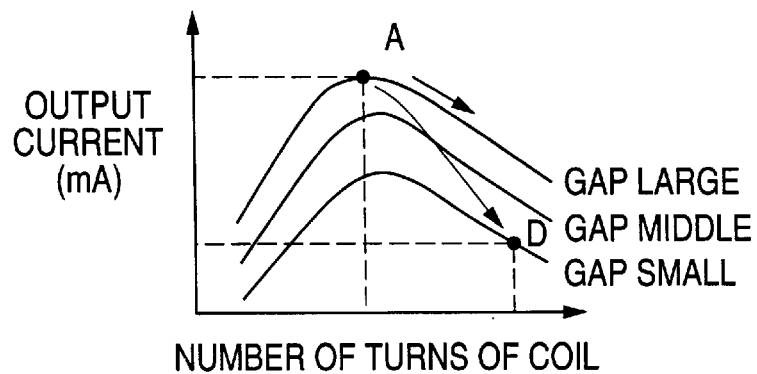
FIG. 11 is a graphical representation of the results of the combination of the first and second embodiments.

The basic configuration of the present invention is shown in FIG. 7a wherein a plurality of different designs of fed members 3a–3n are shown in contrast with a single design of the feeding member 1. Each fed member 3a–3n is associated with its own respective load 31a–31n. Further, the design of each fed member 3a–3n is modified in accordance with the embodiments of the invention such that the single design of the feeding member 1 need not be modified in order to accommodate each independent load 31a–31n. The following is a description of each embodiment of the invention, referring to the drawings where appropriate.

First Embodiment

Figure 1:
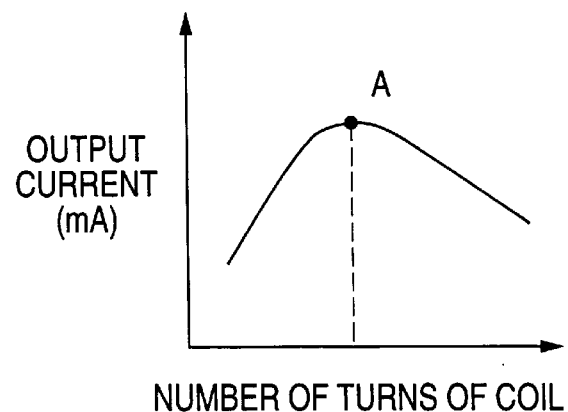
FIG. 1 is a graphical representation of the results of a first embodiment of the invention.

If the number of turns of an induced coil 4 of the fed member 3 is changed with respect to the feeding member 1 which comprises a predetermined smoothing circuit 10, a predetermined oscillation circuit 11, and a predetermined induction coil 2, the relationship shown in FIG. 1 exists between the number of turns and the output current that results in the induced coil 4. When the number of turns is A, the output current becomes maximum. In a typical design for this type of device, the number of turns is set to A to provide maximum current in the output. However, depending on the current requirements of the load 31, the number of turns is made to vary from A without any modifications to the feeding member 1.

Second Embodiment

Figure 2:
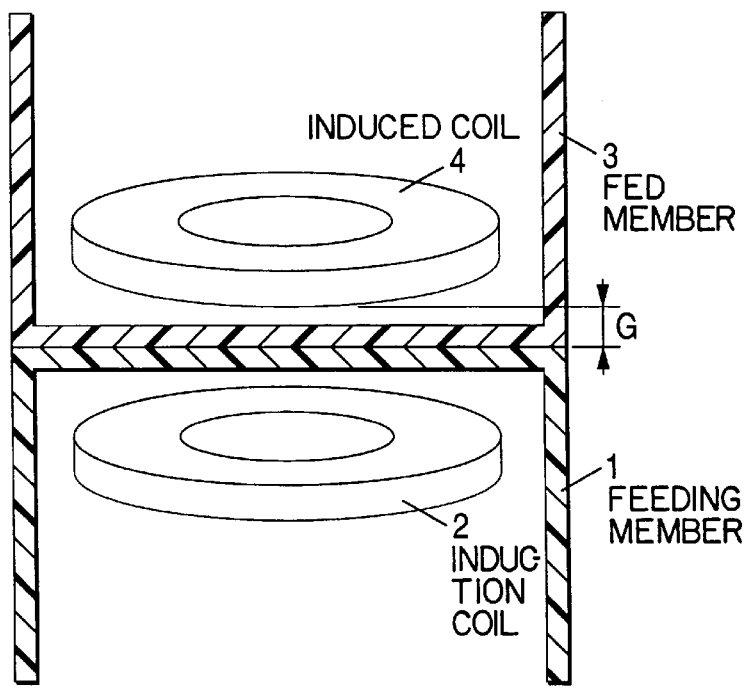
FIGS. 2 (a) and 2 (b) illustrate a second embodiment of the invention, FIG. 2 (a) is a schematic sectional view and FIG. 2 (b) is a graphical representation of the results.
Figure 2:
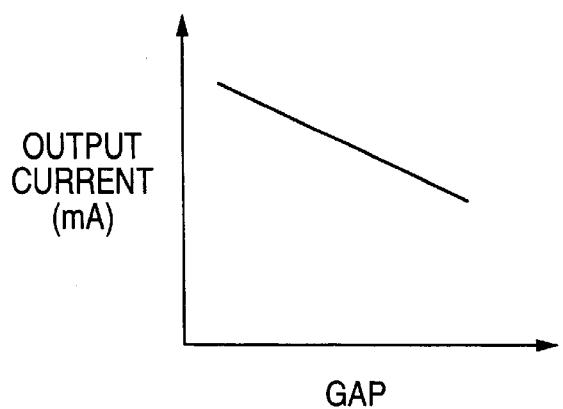

Alternatively, gap G shown in FIG. 2(a) between the contact face of the fed member 3 with the feeding member 1 and the induced coil 4 can be varied to increase or decrease the delivered output current in accordance with FIG. 2(b). The gap G shown in FIG. 2(a) can be varied by either changing the thickness of the outer wall of the fed member 3 or by varying the relative position of the induced coil within the fed member 3.

Third Embodiment

Figure 3:
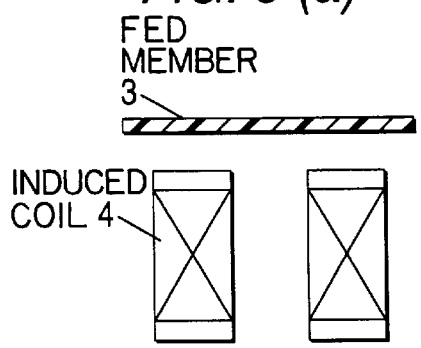
FIGS. 3 (a) to 3 (c) illustrate a third embodiment of the invention, FIGS. 3 (a) and 3 (b) are schematic sectional views and FIG. 3 (c) is a graphical representation of the results.
Figure 3:
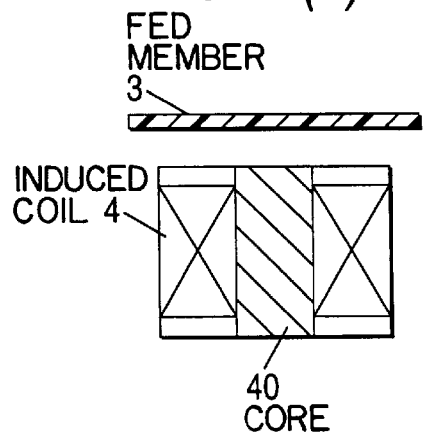
Figure 3:
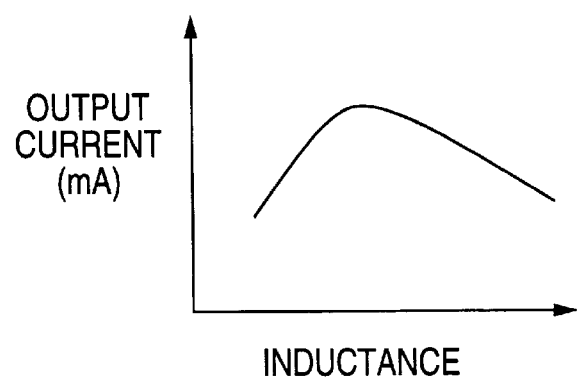

Alternatively, inductance within the non-contact electric power transmission device can be changed by the insertion or non-insertion of a core 40 within the induced coil 4 as shown in FIGS. 3(a) and 3(b). The variance of the inductance effects the output current in the induced coil 4 according to relationship shown in FIG. 3(c).

Fourth Embodiment

Figure 4:
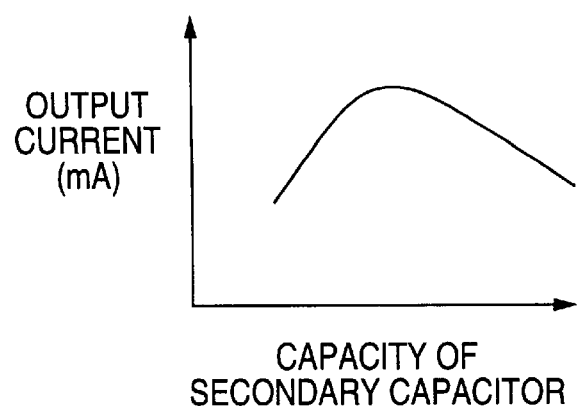
FIG. 4 is a graphical representation of the results of a fourth embodiment of the invention.
Figure 8:
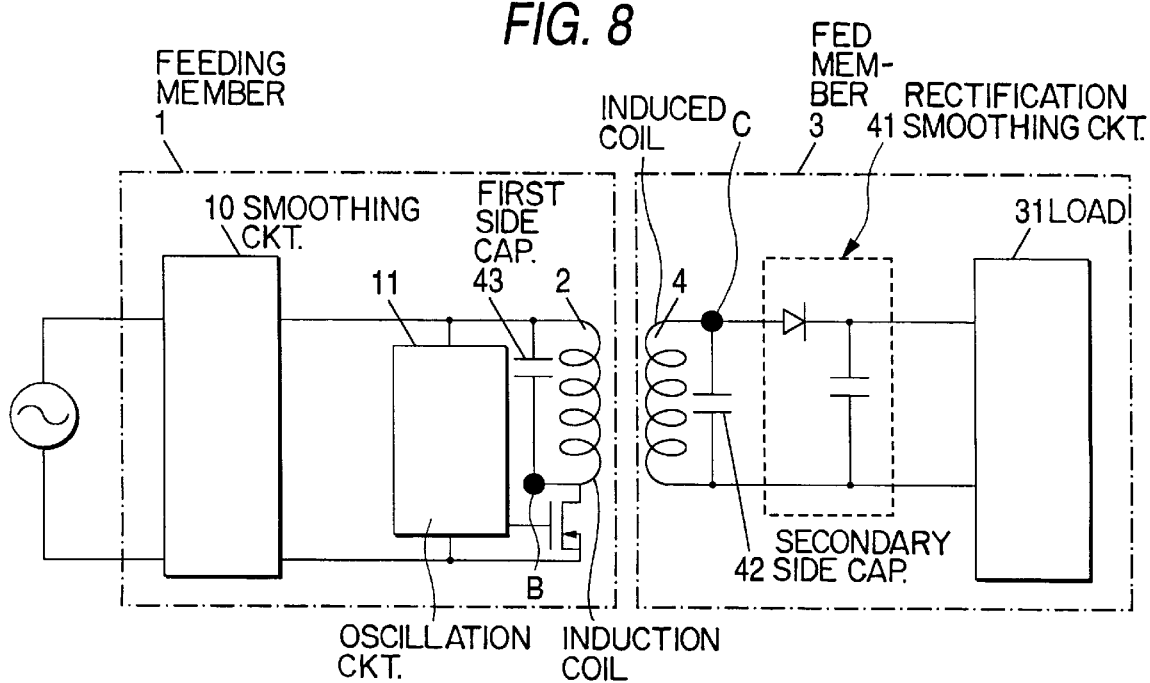
FIG. 8 is a block diagram/schematic drawing illustrating the configuration of a fourth embodiment of the invention.

Also, the value of an output capacitor in the circuit of the fed member 3 can be changed in order to vary the resonant frequency, thus, varying the output current in the induced coil 4 in accordance with the relationship shown in FIG. 4. This effect will be explained in detail with reference to FIGS. 8 through 10(d). In FIG. 8, the reference numeral 41 designates a rectification smoothing circuit 41 in the fed member 3, 42 is a secondary side capacitor, 43 is a first side capacitor. That is, the feeding member 1 has a resonance-type inverter in which the induction coil 2 and the first side capacitor 43 are connected in parallel. The induced coil 4 and the secondary side capacitor 42 constitute a resonant circuit. By changing the capacity, or value, of the secondary side capacitor 42, the matching point with the oscillation frequency of the feeding member 1 is changed. That is, if the capacity of the secondary side capacitor 42 is changed from C1 to C2 as shown in FIG. 9, the energy which can be supplied to the load 31 is changed as shown in FIGS. 10(b) and 10(d). FIGS. 10(a) and 10(c) respectively show the energy waveform at the points B and C in FIG. 8 when the capacity of the secondary side capacitor 42 is C1. FIG. 10(b) and 10(d) respectively show the energy waveform at the points B and C when the capacity of the secondary side capacitor 42 is C2. The amplitude of the energy waveform in the case of capacitor capacity C2 (FIG. 10(d)) is smaller than that in the case of C1 (FIG. 10(b)) at the point C. So the energy which can be supplied to the load 31 (shaded portion in FIGS. 10(c) and 10(d)) is changed. To utilize this effect, the output current that can be taken out from the induced coil 4 (=the energy which can be supplied to the load 31) can be changed.

Fifth Embodiment

Figure 5:
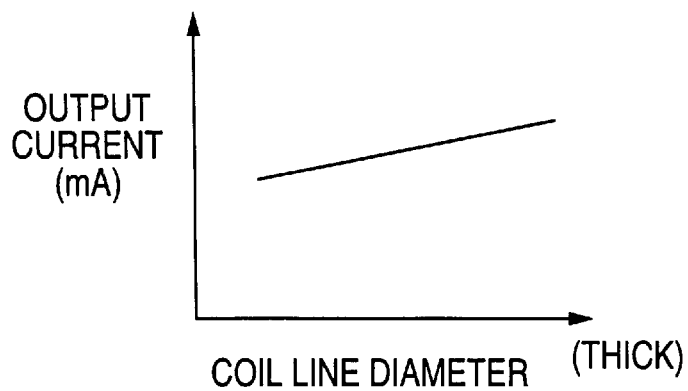
FIG. 5 is a graphical representation of the results of a fifth embodiment of the invention.

According to yet another embodiment of the present invention, the line diameter of the induced coil 4 is changed for varying the output current as shown in FIG. 5.

Sixth Embodiment

Figure 6:
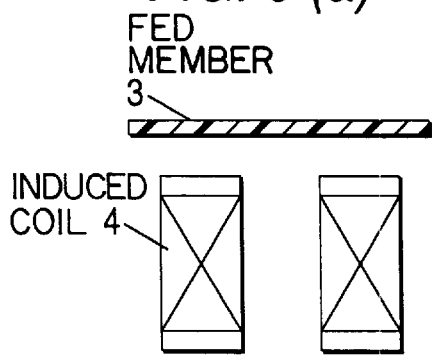
FIGS. 6 (a) to 6 (c) illustrate a sixth embodiment of the invention, FIGS. 6 (a) and 6 (b) are schematic sectional views and FIG. 6 (c) is a graphical representation of the results.
Figure 6:
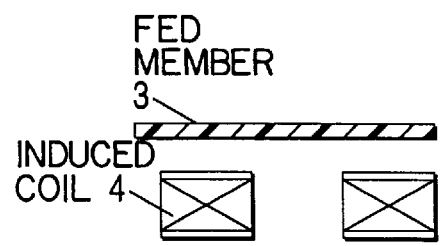
Figure 6:
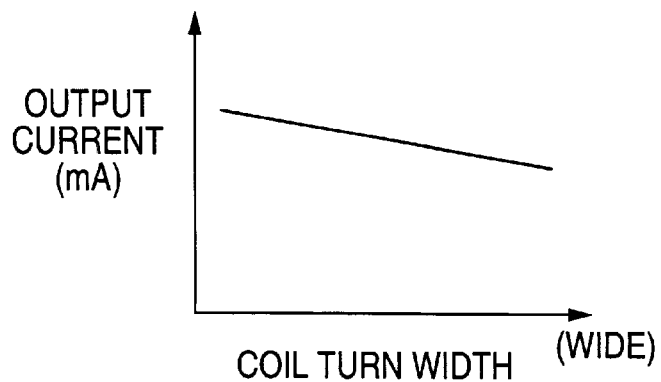
Figure 7:
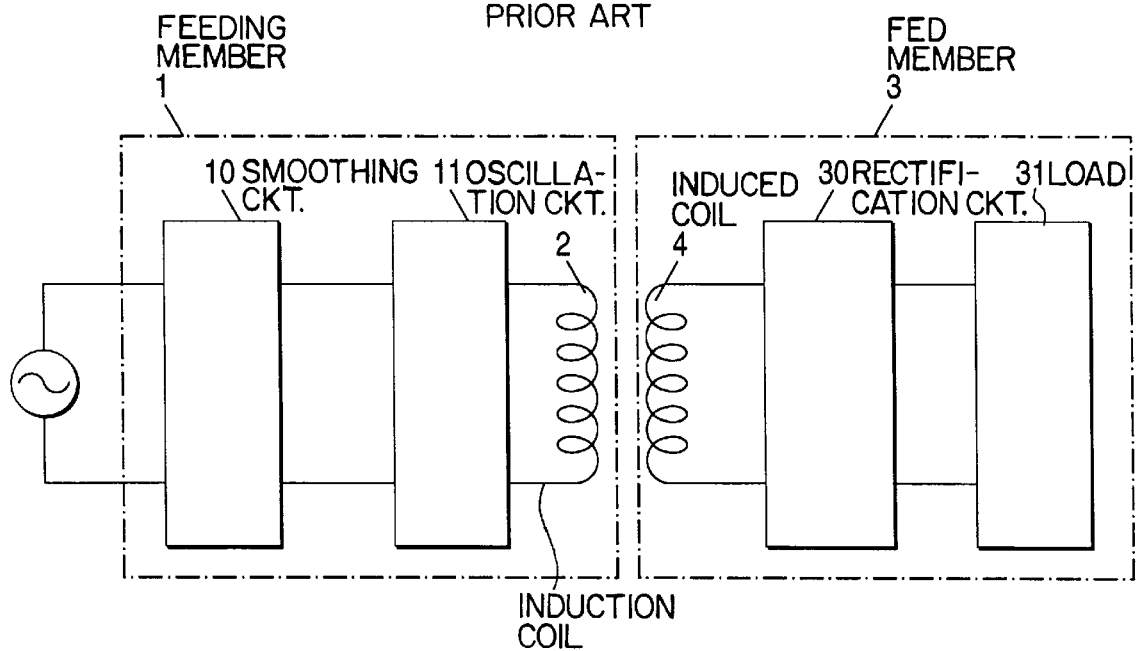
FIG. 7 is a block diagram/schematic drawing illustrating the basic configuration of the prior art.

According to yet another embodiment of the present invention, a coil having a wide turn width as shown in FIG. 6(a) or a narrow turn width as shown in FIG. 6(b) is used as the induced coil 4 to change the output current. As the turn width is widened, the output current that is supplied to the load decreases as shown in FIG. 6(c).

Incidentally, it is possible to combine the foregoing embodiments to obtain the effect of the invention effectively. For example, the number of turns of the induced coil 4 and the gap G can be changed at the same time to adopt the first and second embodiment together as shown in FIG. 1. The extreme large output current difference is obtained between A and D, in this case, the gap G is small at A, and the gap G is large at D. Of course, it is also possible to obtain the large output current difference by the other combinations, for example, the combination of the first embodiment and the third embodiment, the combination of the second embodiment and the fourth embodiment or any other combination of embodiments.

In any event, the circuit of the fed member 3 of the secondary side is changed in design in response to the load of the fed member 3 so that the feeding member 1 of the primary side can be used with no change. In this case, different types of fed members 3 may be able to share the single feeding member 1 or the circuit parts of the feeding member 1 may be the same although the fed members 3 cannot share the feeding member because of the housing form, etc. If different types of fed members 3 share the single feeding member 1, the form of the face of each fed member 3 coming in contact with the feeding member 1 is matched with the form of the face of the feeding member 1 coming in contact with the fed member 3.

Figure 12:
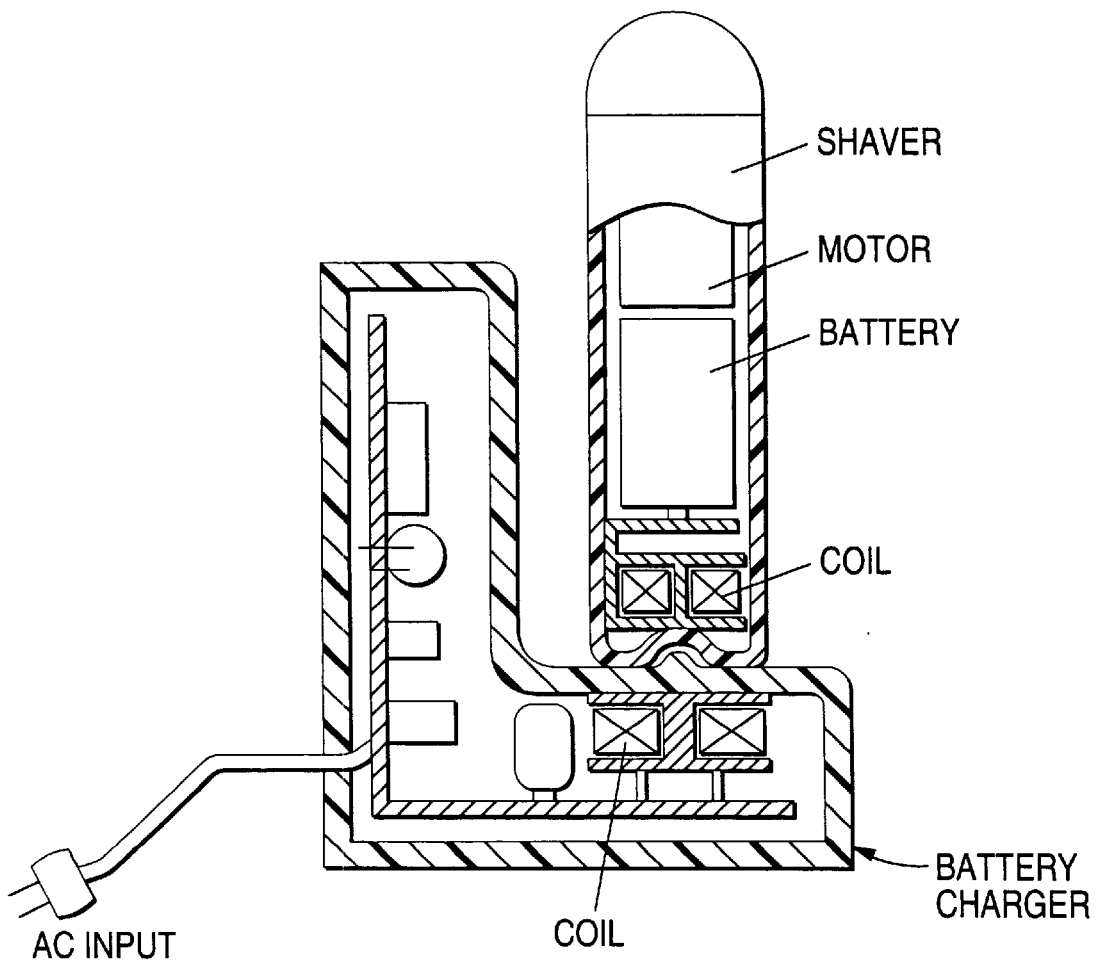
FIG. 12 is a side sectional view of a rechargeable shaver and a battery charger thereof to which the non-contact electric power transmission device according to the present invention is applied.

FIG. 12 shows a side sectional view of a rechargeable shaver and a battery charger thereof to which the non-contact electric power transmission device in accordance with the present invention is applied. The battery charger (feeding member) may have only a single constitution, that is, it can be used in common with respect to different kinds of shavers (fed member) of which batteries (Ni—Cd type, Ni—Mn type or the like), characteristics and types (DC motor, linear motor) of motors differ.

Further, the non-contact electric power transmission device according to the present invention can be applied to any other kinds of electrical products and is not limited to the rechargeable shaver. For example, the present invention can be applied to the electric toothbrush, cellular telephone (cordless telephone in the house, automobile telephone or the like), portable audiovisual equipment (video camera, mini disk player, compact disk player or the like), or the like.

As we have discussed, in the invention, a non-contact power transmission device is provided comprising a feeding member further comprising an induction coil to which electric power is applied and a plurality of fed members each further comprising an induced coil placed in a magnetic field produced by the induction coil. The fed members differ in load and each of the fed members also provides for an accommodation corresponding to the single feeding member for receiving electric power responsive to the load from the feeding member. Thus, if loads differ, only the design of the fed member is changed to cope with the load difference and the feeding member is not changed in design, so that the development design term can be shortened drastically.

What is claimed is:

1. A non-contact electric power transmission device comprising:

a feeding member having an induction coil to which electric power is applied; and a fed member including an induced coil placed in a magnetic field produced by said induction coil and a load to which power is supplied from said induced coil;

wherein a plurality of said fed members are prepared, each of said fed member having its own respective load and being independently designed in accordance with the power requirements of its respective load and in accordance with a magnetic field generated by a single feeding member.

2. The non-contact electric power transmission device according to claim 1, wherein said plurality of fed members are designed to accomodate the electric power required by their respective loads by changing the number of turns of said induced coil.

3. The non-contact electric power transmission device according to claim 1, wherein said plurality of fed members are designed to accommodate the electric power required by their respective loads by changing a gap existing between a contact face of an outer face of each of said plurality of fed members and said induced coil.

4. The non-contact electric power transmission device according to claim 1, wherein said plurality of fed members are designed to accommodate the electric power required by their respective loads depending on whether or not a core of said induced coil exists.

5. The non-contact electric power transmission device according to claim 1, wherein said feeding member has an inverter in which said induction coil and a first side capacitor are connected in parallel, and said plurality of fed members are designed to accommodate the electric power required by their respective loads by changing a capacity of a capacitor which is connected to said induced coil in parallel so as to constitute a resonant circuit.

6. The non-contact electric power transmission device according to claim 1, wherein said plurality of fed members are designed to accommodate the electric power required by their respective loads by changing a turn width of said induced coil.

7. The non-contact electric power transmission device according to claim 1, wherein said plurality of fed members are designed to accommodate the electric power required by their respective loads by changing a line diameter of said induced coil.

8. A plurality of non-contact electric-power storing apparatuses to which constant electric power is supplied, each electric-power storing apparatus comprising:

an induced coil for receiving the constant electric power; and a load;

wherein each of said plurality of non-contact electric-power storing apparatuses is independently designed to accommodate for power requirements of its respective load.

9. The non-contact electric-power storing apparatus according to claim 8, wherein each of said non-contact electric power storing apparatuses are designed to accommodate the electric power required by their respective loads by changing the number of turns of said induced coil.

10. The non-contact electric-power storing apparatus according to claim 8, wherein each of said non-contact electric power storing apparatuses are designed to accommodate the electric power required by their respective loads by changing a distance between an outer face of said electric-power storing apparatus and said induced coil.

11. The non-contact electric-power storing apparatus according to claim 8, wherein each of said non-contact electric power storing apparatuses are designed to accommodate the electric power required by their respective loads depending on whether or not a core of said induced coil exists.

12. The non-contact electric-power storing apparatus according to claim 8, wherein each of said non-contact electric power storing apparatuses are designed to accommodate the electric power required by their respective loads by changing a capacity of a capacitor which is connected to said induced coil in parallel so as to constitute a resonant circuit.

13. The non-contact electric-power storing apparatus according to claim 8, wherein each of said non-contact electric power storing apparatuses are designed to accommodate the electric power required by their respective loads by changing a turn width of said induced coil.

14. The non-contact electric-power storing apparatus according to claim 8, wherein each of said non-contact electric power storing apparatuses are designed to accommodate the electric power required by their respective loads by changing a line diameter of said induced coil.

* * * * *